United States Patent
Wallenstein

[15] 3,665,230
[45] May 23, 1972

[54] DEVICE FOR INCREASING THE INTENSITY OF GAS COOLING OF ELECTRICAL MACHINES WITH HIGH-SPEED ROTOR

[72] Inventor: Mihály Wallenstein, Budapest, Hungary

[73] Assignee: Ganz Villamossagi Muvek, Budapest, Hungary

[22] Filed: Oct. 19, 1970

[21] Appl. No.: 81,874

[30] Foreign Application Priority Data

Dec. 30, 1969   Hungary..........................GA-988/69

[52] U.S. Cl..................................310/60, 310/214, 310/262
[51] Int. Cl. .........................................................H02k 9/06
[58] Field of Search ..............................310/60, 214, 262, 61

[56] References Cited

UNITED STATES PATENTS

| | | | |
|---|---|---|---|
| 1,504,622 | 8/1924 | Hellmund | 310/214 X |
| 2,921,208 | 1/1960 | Morrill | 310/214 |

Primary Examiner—D. X. Sliney
Attorney—Young & Thompson

[57] ABSTRACT

A turbo-generator has a rotor having openings therethrough and stator windings also having openings therethrough, and ribs on the stator that extend toward but are spaced from the rotor and that are parallel to the axis of the rotor for augmenting the circulation of gas relative to the rotor surface and through the rotor.

2 Claims, 6 Drawing Figures

PATENTED MAY 23 1972 3,665,230

Inventor
MIHALY WALLENSTEIN
By Young + Thompson
Attorneys

DEVICE FOR INCREASING THE INTENSITY OF GAS COOLING OF ELECTRICAL MACHINES WITH HIGH-SPEED ROTOR

In order to improve the specific power output, particularly of high-output rotating electric machines, in the first place, that of turbo-generators, the intensive cooling of the rotor, the dissipation of heat loss generated in the rotor with the least possible temperature rise of the winding is a point of fundamental importance.

With any cooling system of the rotor, e.g., indirect cooling only on the surface of the rotor, or direct conductor cooling, it is equally essential that the quantity of cooling medium that comes into contact with the cooling surface, shall be the largest, and the relative flow velocity of the medium with respect to the cooled surface shall be as high as possible; the first with a view to the warming up of the coolant, the second to the keeping down of temperature gradient.

The invention is related to such types of electric machines in which heat loss generated in the rotor (in the straight section of the conductors embedded in slots and in the active iron body of the rotor, particularly in the surface zone of the latter) is dissipated by a gaseous cooling medium flowing in the air gap (between the stator and the iron body of the rotor) of the machine. Here belong, for instance, air-cooled high-speed machines and also turbo-generators with rotor cooled by hydrogen (under pressure), of the "gap pick-up" system.

With such electrical machines where rotors are cooled from the rotor surface either by indirect surface cooling, or by the direct cooling of the conductors through a gaseous cooling medium that flows in the air gap, the intensity of the cooling is considerably influenced by the gas flow conditions brought about in the air gap by the rotation of the rotor.

The phenomenon that a rotor of high peripheral speed tends to carry the gas particles that come into contact with it is well known. Owing to friction between gas particles, the tendency of rotating with the rotor of the gas that fills the air gap exists, though to a lesser degree, also at some distance from the rotor surface, whereas the inner surface of the stator iron body tends to brake down the circulation of gas in the air gap.

Figure 1:
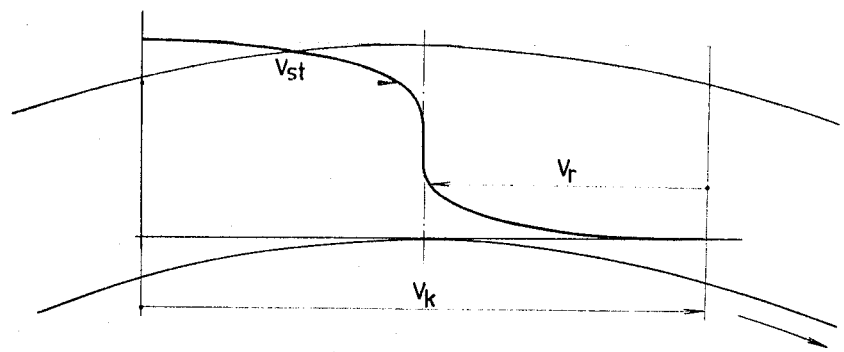
FIG. 1 is a graph of gas velocity at different radial points in the air gap of a conventional machine in operation.

FIG. 1 represents the gas-velocity distribution developed in consequence of the rotation of the rotor in any chosen cross-section of the air gap. The figure shows gas velocity distribution both as viewed from the stator $V_{st}$ and from the rotor $V_r$ side, $V_k$ being the peripheral speed of the rotor. The figure illustrates the known distribution picture where the cooling gas keeps circulating in the middle, major section of the air gap, between the boundary layers developed along the stator and rotor surfaces and tending to stick to them, at half of the peripheral speed of the rotor ($V_k/2$), in the direction of rotation of the rotor. The same picture is obtained from the examination of the phenomenon from the rotor side, with respect to the rotor: the cooling gas circulating in the main portion of the air gap in the direction of rotation of the rotor lags behind the speed of the rotor surface by the half of the peripheral speed.

The aim of the invention is to increase the lagging of the cooling gas behind the peripheral velocity of the rotor surface, i.e., to increase the relative speed between rotor surface and gas to the highest possible degree, to keep down the boundary layer sticking to the rotor as far as possible, and to break up the boundary layer at least at some spots, disturbing its development.

Under the effect of increased relative velocity between rotor surface and cooling gas, with indirectly cooled rotors (of surface cooling) the temperature drop on the surface decreases, and with "gap pick-up" system rotors, the gas-circulating effect of the openings made in the rotor surface increases. This injecting and sucking off effect of the openings forms the basic principle of such rotor cooling systems. For such rotors the increase of gas flow has a double significance: the temperature rise of the gas in direct contact with the winding is kept down and, because of higher gas velocity the surface temperature drop produced on the cooling surfaces of directly cooled windings decreases.

With high-power and high-efficiency turbo-generators where the main part of so-called stray load losses are produced on the surface of the rotor iron body, the advantages of the invention appearing in the cooling of higher intensity of the rotor surface and in the improvement of the intensity of the "gap pick-up" system direct cooling of the conductors can be put to equally good use.

Figure 2:
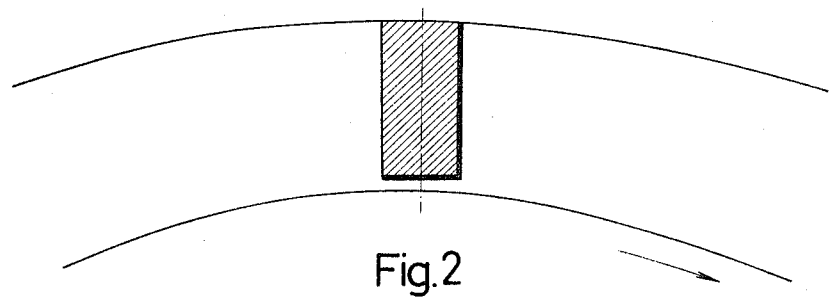
FIGS. 2 and 3, show different arrangements to increase the cooling gas velocity relative to the rotor.
Figure 3:
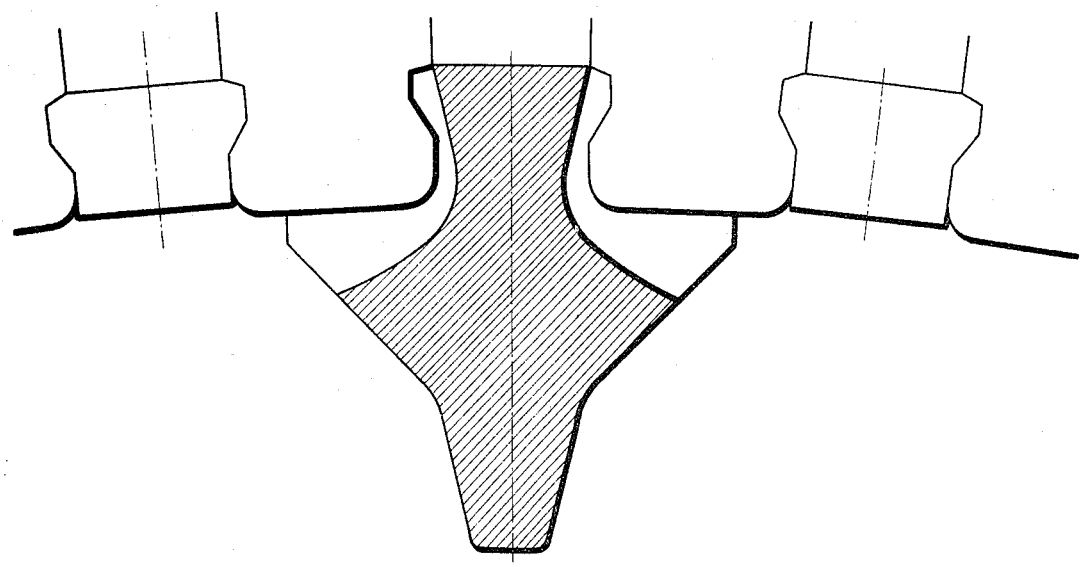
Figure 3:
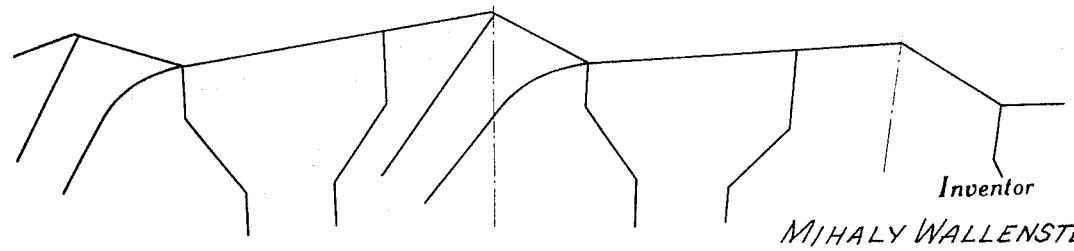

The invention reaches its aim outlined above by providing air gap dams at some places of the stator core inner periphery selected to that purpose, the dams protruding into the air gap and coming close to the rotor surface (FIG. 2). Such dams can be formed from some of the teeth of the stator iron body, from some of the wedges closing the slots, and also as components fastened to the stator iron body for this purpose.

A possible realization of the invention is shown in FIG. 2, where along some generatrices of the stator bore the air gap dams forming the essence of the invention, protruding into the air gap and coming close to the rotor, are made by suitably forming the wedges that fasten the windings. The wedges consist of elements of the same lengths as standard wedges, are fastened in the keyways made for them, but for a better mechanical strength and to prevent vibration, they additionally bear against the adjoining teeth.

The air gap dams according to the invention can be suitably placed in the upper part of the stator bore so that no damage can be done when the rotor is inserted into the stator bore.

Figure 4:
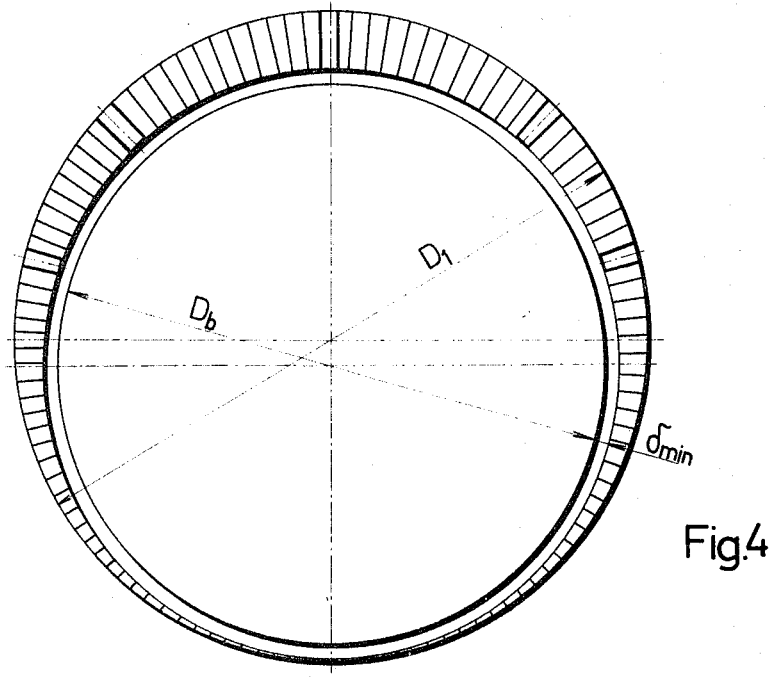
FIG. 4 is a schematic to indicate relative dimensions of the air gap during its installation in the stator.

FIG. 4 represents the position of the rotor when being inserted into the stator, by the largest rotor diameter and the outer diameter of the retaining ring $D_b$ that hold down the coils. Between these and the contour $D_1$ of the stator can be found the space shown in the Figure (with a safety margin of $\gamma_{min}$) in which the dams according to the invention can be accommodated.

With respect to the application of the invention its relationship with the ventilation system of the entire machine, of the stator and of the rotor, should be considered. It is by no means desirable that the application of the air gap dams according to the invention should considerably reduce the quantity of gas circulated in the machine. From among the usual ventilation systems applied to "gap pick-up" rotors and to their stators the sectional systems (along the length or periphery) can best be combined with the solution according to the invention.

Figure 5:
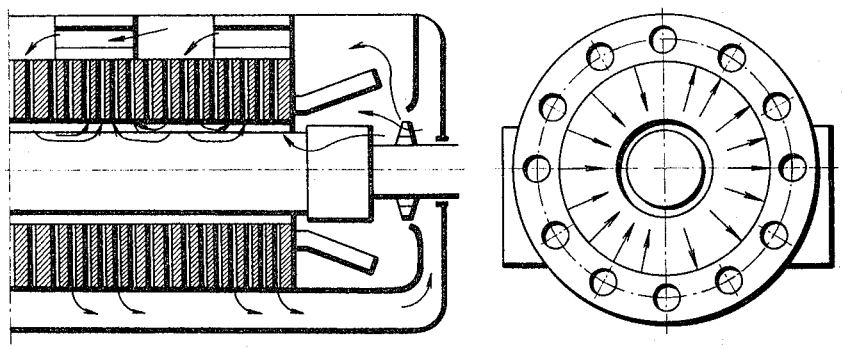
FIGS. 5 and 6 show alternative flow path arrangements according to the invention.

A sectional system along the length of the machine is shown in FIG. 5. With this system both stator iron body and rotor are divided into sections along the length of the machine. In these sections the cool gas streams through the ventilating ducts of the stator core towards the air gap and enters the gap through openings made on the rotor surface, whereas in the next section, the warmed cooling gas flows from the rotor into the air gap and leaves through the ventilating ducts of the stator core. In some systems the sections are separated by ring-shaped discs fastened to the stator and to the rotor, respectively, matching one another, with small gaps in order to utilize the pressure of the main fans to secure the best possible ventilation of the rotor.

With such sectional ventilation system along the length, the air gap dams according to the invention can be applied to advantage either in the inlet or in the outlet sections, preferably in both, as an increase of the relative gas velocity in a "gap pick-up" system is desirable both in the inlet and outlet openings.

The axial dams according to the invention may be combined with known annular ribs.

Figure 6:
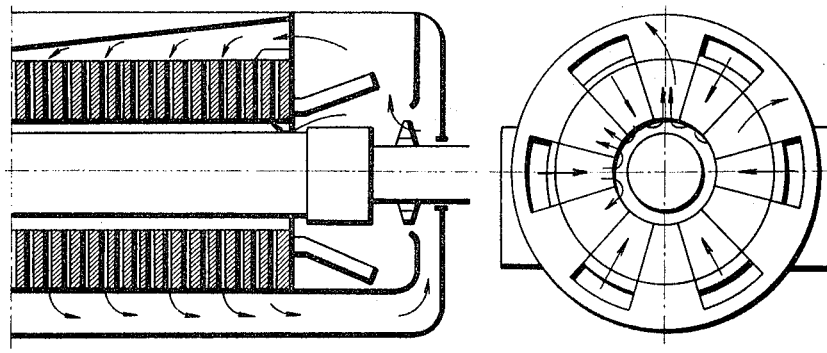

The advantages of the invention can be best used with ventilation systems sectioned along the periphery (so-called tangential systems) (FIG. 6). Here the rotor is not sectioned, and the inlet and outlet openings of the "gap pick-up" system alternately follow one another upon the rotor surface. The cool gas enters the air gap through the ventilating ducts of the inlet sections developed along the periphery of the stator core. In the gap the gas flows tangentially along the periphery (not axially) and leaves the gap through other parts of the stator core forming the outlet sections.

One of the significant advantages of this ventilation system is that a considerable quantity of gas can be circulated in the machine and thus in the air gap. Another great advantage with respect to the rotor is that a part of the gas injected into the air gap, especially by a suitable arrangement of the dams according to the invention, can be forced to flow in opposite direction to the rotation of the rotor. Thus the relative velocity of first-rate significance for the rotor cooling can further be increased.

What we claim is:

1. A turbo-generator having a rotor having openings therethrough and stator windings also having openings therethrough, and ribs on the stator that extend toward but are spaced from the rotor and that are parallel to the axis of the rotor for augmenting the circulation of gas relative to the rotor surface and through the rotor.

2. A turbo-generator as claimed in claim 1, said stator having windings fastened by wedges disposed in keyways in the stator, said ribs being disposed in said keyways and overlying and bearing against adjacent portions of the stator surfaces that confront the rotor.

* * * * *